United States Patent
Fowkes et al.

(12)

(10) Patent No.: US 10,088,078 B2
(45) Date of Patent: Oct. 2, 2018

(54) SUBSEA DRYING SYSTEM

(71) Applicant: Subsea 7 Limited, London (GB)

(72) Inventors: Mick Fowkes, Banchory (GB); Paul Booth, Oyne (GB)

(73) Assignee: Subsea 7 Limited, Sutton (GB)

( * ) Notice: Subject to any disclaimer, the term of this patent is extended or adjusted under 35 U.S.C. 154(b) by 0 days.

(21) Appl. No.: 15/501,816

(22) PCT Filed: Aug. 6, 2015

(86) PCT No.: PCT/GB2015/052281
§ 371 (c)(1),
(2) Date: Feb. 3, 2017

(87) PCT Pub. No.: WO2016/020690
PCT Pub. Date: Feb. 11, 2016

(65) Prior Publication Data
US 2017/0234460 A1    Aug. 17, 2017

(30) Foreign Application Priority Data
Aug. 6, 2014 (GB) .................................. 1413927.3

(51) Int. Cl.
*F16L 1/26* (2006.01)
*F16L 55/175* (2006.01)

(52) U.S. Cl.
CPC .............. *F16L 1/26* (2013.01); *F16L 55/175* (2013.01)

(58) Field of Classification Search
CPC ... F16L 1/26; F16L 55/175; F16L 1/12; E21B 41/0007

USPC ...................................................... 405/184.1
See application file for complete search history.

(56) References Cited

U.S. PATENT DOCUMENTS

| 3,670,680 A | 6/1972 | Kriedt |
| 7,708,839 B2 | 5/2010 | Yemington |

FOREIGN PATENT DOCUMENTS

| EP | 2 600 051 | 6/2013 |
| GB | 2 080 476 | 2/1982 |
| JP | 58081423 | * 5/1983 |
| WO | WO 2005/114036 | 12/2005 |
| WO | WO 2006/062512 | 6/2006 |
| WO | WO 2011/070354 | 6/2011 |

* cited by examiner

*Primary Examiner* — Sean D Andrish
(74) *Attorney, Agent, or Firm* — Levy & Grandinetti

(57) ABSTRACT

A subsea drying system (10) for drying a chamber (12) underwater has an upstream piping (24, 26, 28) for conveying a pressurized drying fluid from a source (18) to the chamber (12); and downstream piping (36, 38, 40) for expelling liquid displaced from the chamber (12) by the drying fluid in an open-loop dewatering mode. In a closed-loop dehumidifying mode, a recirculation path (54) between the downstream piping (36, 38, 40) and the upstream piping (24, 26, 28) conveys drying fluid exiting the chamber (12) back into the chamber (12) after passing through a dehumidifier (58). A valve system selectively closes and opens the re-circulation path to expel displaced liquid when that path is closed and to recirculate drying fluid from the chamber (12) through the dehumidifier (58) to the upstream piping (24, 26, 28) when that path is open.

17 Claims, 2 Drawing Sheets

SUBSEA DRYING SYSTEM

BACKGROUND OF THE INVENTION

Field of the Invention

This invention relates to a subsea drying system for de-watering and dehumidifying a chamber underwater, for example before injecting a grouting material into the chamber. Such a chamber may be defined by a fitting such as a clamp around a subsea pipe.

Description of Related Art

Installation of a hollow fitting on a pipe of a subsea pipeline defines a gap or chamber between the pipe and the fitting. Where such a fitting encircles the pipe, the result is an annular chamber between the outer diameter of the pipe and the inner diameter of the fitting.

When a hollow fitting is installed on a pipeline underwater, water is trapped in the chamber defined between the pipe and the fitting. In some instances it is necessary to expel the water and to dry the chamber, for example to prepare the chamber to serve as a mould to receive an injection of a grout.

In particular, it is known in the subsea oil and gas industry to repair a subsea pipeline in situ underwater by injecting a settable fluid inside a clamp chamber that covers the damaged region to be repaired. For example, such a method may be used to repair a coating on a pipeline, where plastics material is injected as a grout into a mould to mitigate damage to the coated pipeline wall. The grout is typically a curable thermoset material such as an epoxy resin.

WO 2011/070354 discloses an example of a clamp that is installed around a damaged region of a subsea pipe to define a chamber between the clamp and the pipe. Once the chamber has been dried, an epoxy grout is injected into the chamber until the damage is sufficiently repaired. The clamp is generally left on the pipeline until a definitive repair can be performed, which may include removing and replacing the damaged section of the pipeline.

Any residual water remaining in the chamber when grout is injected may cause corrosion of the pipe. Residual water may also cause detachment or failure of the repair by remaining trapped within the grout layer or between the grout and the steel surface of the pipe. Thus, a challenge of the repair method disclosed in WO 2011/070354 is that the chamber between the pipeline and the clamp, which is initially full of water, is difficult to dry sufficiently.

It is known to dry a chamber underwater by passing a flow of a drying fluid such as dry air or dry nitrogen through the chamber. The drying fluid is pumped through hoses or downlines from a surface vessel. The drying fluid expels water and dries the chamber over a period of time, which may be a few hours. Drying fluids need not be gases but could comprise liquids such as alcohols: for example ethanol and methanol are known as drying agents.

When using air or nitrogen as a drying gas, tests indicate a typical drying time of about three hours for a chamber with a volume of less than 1 m³. In deeper water, a huge quantity of drying gas would be consumed in such a period due to the high ambient pressure at depth. This drawback does not exist onshore or in shallow water, where it is easy to pump sufficient gas to dry a chamber.

Similarly, it is known to use a drying gas to de-water pipelines, such as gas pipelines made of damp-sensitive materials such as Duplex alloys. In that solution, a drying gas is fed into the pipeline under pressure or between two dewatering pigs.

For example, U.S. Pat. No. 7,708,839 describes a de-watering solution for a pipeline, in which a pump at one end of a pipeline draws water out of the pipeline and pressurised gas is simultaneously injected at the other end of the pipeline. However, this de-watering solution is overly complicated and impractical for use in drying a small subsea chamber. A further drawback of this approach is that the water drawn out of the pipeline may contain chemicals that have to be recovered or released into the surrounding sea.

Delivering a large volume of gas under high pressure to depth is complex and costly and indeed is impractical in deep water. There, the gas hoses serving as downlines are a weak point because they may burst or collapse under a pressure difference between the gas they contain and the hydrostatic pressure of the surrounding water at depth. Additionally, mobilising dry nitrogen or dry air to the job site takes up valuable time and occupies substantial deck space on the surface vessel. In this respect, such gases are typically supplied to the subsea engineering industry in 'quads' comprising stacks of pressurised cylinders in a large cuboidal frame. Such gases can also be produced by bulky mobile membrane generators, for example as commercialised by Weatherford (RTM) under the name 'Nitrogen Production Units'.

WO 2005/114036 teaches injecting a drying fluid such as air, nitrogen or an alcohol compound into a repair clamp from a surface vessel, preferably through steel or plastics tubing. Here again, it is complicated and time-consuming to install a drying fluid line between the surface vessel and a chamber of the repair clamp.

U.S. Pat. No. 3,670,680 teaches the use of a chemical reaction to produce pressurised gas for one-shot de-watering of the internal chamber of a subsea hydraulic power unit (HPU). Water expelled from the chamber by the pressure of the gas is released into the surrounding sea. A drawback of this proposal is that it cannot achieve sufficient dryness in a chamber that is to be used for the purpose of grouting. To produce a prolonged flow of drying gas, the chemicals serving as the source of gas would have to be replaced so frequently as to make the proposal entirely impractical, especially in deep-water applications. In practice, to achieve sufficiently prolonged flow, a drying gas would have to be supplied through a downline from a surface vessel like the de-watering systems described above.

WO 2006/062512 describes a pumping system to pressurise a small space between two seals to perform subsea backseal test. This disclosure does not teach drying; it merely elevates the static pressure in a small closed volume, which would not be effective to dry the chamber of a full clamp.

Subsea welding habitats are also known. A welding habitat is a closed chamber in which the atmosphere is dried and filled with a breathable gas for divers to weld subsea structures such as pipelines. Generally, however, the breathing gas is circulated from the surface, which is a complex and failure-prone arrangement requiring comprehensive back-ups. In any event, diver intervention is only possible in relatively shallow water. Also, whilst closed-loop underwater breathing systems are known as a permanent integral part of a hyperbaric caisson, a diving bell or a manned submersible, such systems are not designed for drying but only for maintaining a breathable atmosphere.

For completeness, though not particularly relevant, GB 2080476 describes an apparatus for mending a fractured underwater pipe. The apparatus comprises hingingly coupled semi-circular half shells creating a cavity around the pipe when closed. A resin port is provided for pumping epoxy resin into the cavity and a vent port for expelling water. In use, the epoxy resin becomes chemically bonded to the pipe to mend the fracture.

BRIEF SUMMARY OF THE INVENTION

Against this background, the invention provides a subsea drying system for de-watering and dehumidifying a chamber underwater. Broadly, the invention is characterised by subsea recirculation of a drying fluid in a loop that contains a drying device for removing moisture from the flow of drying fluid.

From one aspect, the invention resides in a subsea drying system for drying a chamber underwater. The system comprises: a source of pressurised drying fluid; upstream piping between the source and a chamber inlet interface for conveying drying fluid to the chamber in use; downstream piping between a chamber outlet interface and an outlet for conveying to the outlet and expelling from the system through the outlet liquid displaced from the chamber by drying fluid entering the chamber in a dewatering mode; a recirculation path between the downstream piping and the upstream piping for conveying drying fluid exiting the chamber from the downstream piping to the upstream piping in a dehumidifying mode; a dehumidifier in the recirculation path; and a valve system for selectively closing and opening the recirculation path to direct liquid from the chamber through the outlet when that path is closed and to direct drying fluid exiting the chamber through the dehumidifier to the upstream piping when that path is open.

Advantageously, the drying system is operable in open loop in the dewatering mode and in closed loop in the dehumidifying mode.

The drying system may further comprise a pump in the recirculation path for driving recirculating flow of the drying fluid along the recirculation path.

At least one moisture sensor may be provided in the recirculation path for sensing a dryness level of the drying fluid exiting the chamber. There may be at least one moisture sensor in the recirculation path upstream of the dehumidifier and at least one moisture sensor in the recirculation path downstream of the dehumidifier.

The outlet may be arranged to discharge liquid from the chamber into surrounding water in use. Alternatively, the outlet may communicate with an extractor pipe or storage tank to receive liquid from the chamber.

The drying system of the invention is preferably implemented as a transportable unit that can be lowered through water and docked with a subsea fitting or structure defining the chamber. For example, the drying system may be implemented on a remotely operated underwater vehicle "ROV" transportable subsea skid.

The inventive concept extends to a subsea fitting or structure defining a chamber, fitted with or docked with a drying system of the invention.

The inventive concept also embraces a method of drying a chamber underwater. The method of the invention comprises: conveying pressurised drying fluid to the chamber; displacing liquid from the chamber as drying fluid enters the chamber to dewater the chamber; dehumidifying drying fluid exiting the chamber; and recirculating drying fluid that has been dehumidified after exiting the chamber back into the chamber to dehumidify the chamber.

Preferably, dewatering the chamber is performed in an open-loop configuration and dehumidifying the chamber is performed in a closed-loop configuration. Switching from the open-loop configuration into the closed-loop configuration may take place upon displacing most of the liquid initially occupying the chamber.

A dryness level of the drying fluid exiting the chamber may be sensed before dehumidification, and preferably also after dehumidification and before recirculation back into the chamber.

In summary, therefore, the invention resides in a subsea closed-loop drying system for drying the inner volume of a closed subsea chamber. The drying system may comprise a support frame such as a skid structure. Optionally, buoyancy elements may be provided to make the system neutrally buoyant, with variable buoyancy such as ballast reservoirs being preferred. Interfaces may be provided so that the system can be transported by or attached to an ROV. Further interfaces may be provided for removably attaching the system to a structure that defines the chamber or that is positioned adjacent to the chamber.

A drying circuit of the system suitably comprises piping and a pneumatic interface with the subsea chamber, such that the piping and the interface create a closed pneumatic piping loop that includes the chamber. At least one reservoir for drying fluid such as air or nitrogen can be brought into fluid communication with the piping loop. Valves are provided for isolating parts of the piping loop.

An outlet may be provided for evacuating residual water during a first phase of drying. The outlet can be in fluid communication with or isolated from the piping loop. At least one pump may be provided for circulating fluids in the piping loop.

A dehumidifying device catches and removes water molecules that flow with drying fluid in the piping loop. At least one sensor may be provided to measure the residual humidity of the drying fluid. A drying control system responsive to the sensor may be located subsea; alternatively, control may be effected from a surface vessel.

The apparatus of the invention may further comprise a grout injection circuit, which may be implemented on the same skid or supporting structure as the drying system or may be independent of the drying system.

The invention also resides in a method for drying the inner volume of a subsea chamber, which method comprises: lowering a drying system such as a drying skid through seawater; positioning the system on a subsea structure or fitting that defines the chamber; pneumatically coupling the system with the chamber; releasing a first volume of a drying fluid into a circuit comprising upstream piping of the system, the chamber, downstream piping of the system and an outlet communicating with the downstream piping; closing a valve between the downstream piping and the outlet; opening valves to create a closed-loop pneumatic circuit comprising upstream piping of the system, the chamber, downstream piping of the system, a dehumidifying apparatus and a piping loop between the dehumidifying apparatus and the upstream piping; releasing a second volume of drying fluid into the closed loop circuit; activating a pump to circulate the fluid through the closed loop comprising the dehumidifying circuit; measuring humidity in the closed loop at least downstream of the dehumidifying apparatus; de-activating the pump when the fluid in the closed loop circuit is dry enough; and de-coupling the system from the chamber for retrieval of the system to the surface.

Broadly, a subsea drying system of the invention for drying a chamber underwater comprises: upstream piping for conveying a pressurised drying fluid from a source to the chamber; and downstream piping for expelling liquid displaced from the chamber by the drying fluid in an open-loop dewatering mode. In a closed-loop dehumidifying mode, a recirculation path between the downstream piping and the upstream piping conveys drying fluid exiting the chamber back into the chamber after passing through a dehumidifier. A valve system selectively closes and opens the recirculation path to expel displaced liquid from the system when that path is closed and to recirculate drying fluid from the chamber through the dehumidifier to the upstream piping when that path is open.

BRIEF DESCRIPTION OF THE SEVERAL VIEWS OF THE DRAWINGS

In order that the invention may be more readily understood, reference will now be made, by way of example, to the accompanying drawings in which.

DETAILED DESCRIPTION OF THE INVENTION

The drawings adopt the convention that open valves are shown in white and closed valves are shown in black.

Figure 1:
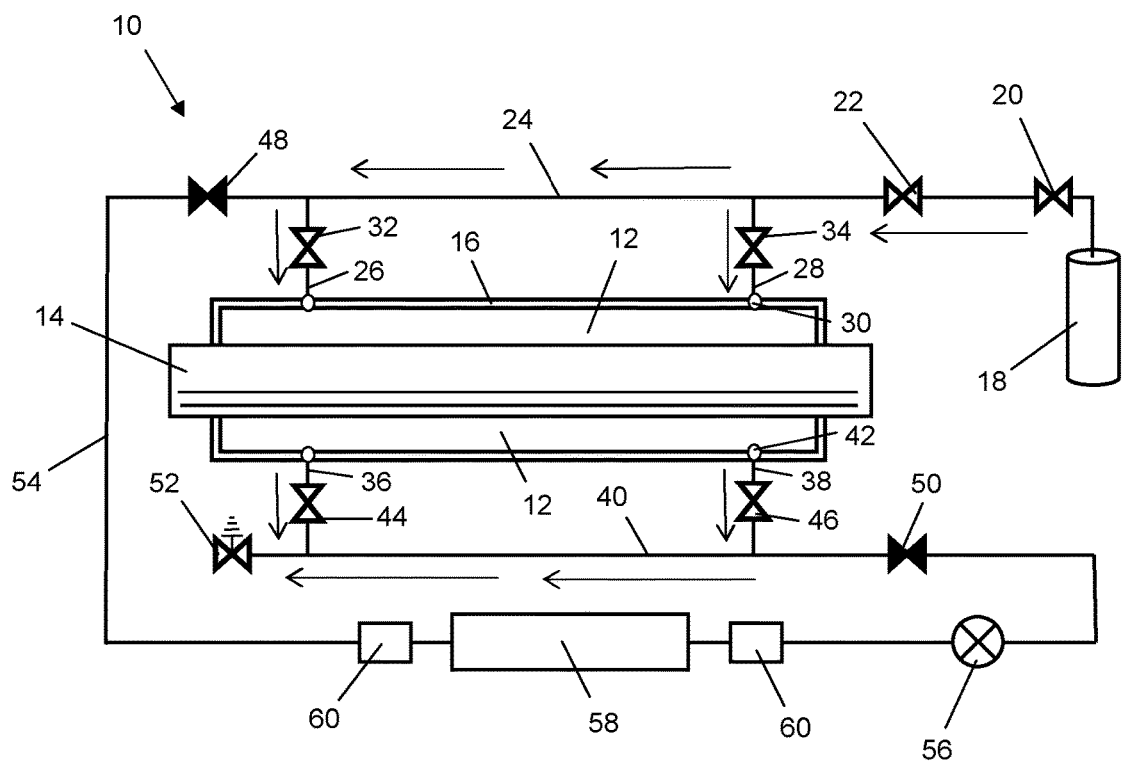
FIG. 1 is a schematic system diagram of a subsea drying system of the invention in a dewatering mode.
Figure 2:
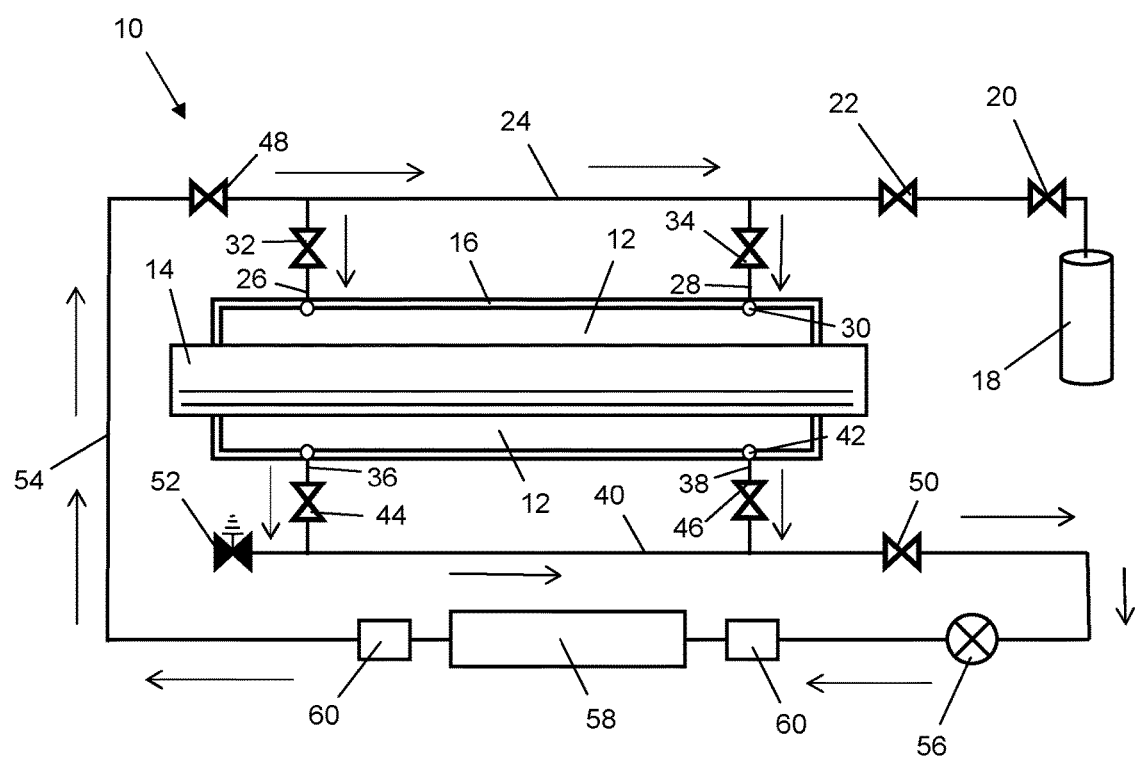
FIG. 2 corresponds to FIG. 1 but shows the subsea drying system of the invention in a dehumidifying mode.

FIGS. 1 and 2 show a subsea drying system 10 in accordance with the invention for de-watering and dehumidifying a chamber 12 underwater. The chamber 12 is defined between a subsea structure exemplified here as a pipe 14 and a hollow fitting such as a tee or clamp 16 that encircles the pipe 14. Thus, in this example, the chamber 12 is annular although the shape of the chamber 12 is not essential to the invention.

Other components of the subsea drying system 10 shown in FIGS. 1 and 2 are suitably implemented together on a drying skid that can be lowered to and coupled underwater to dedicated openings or ports in the clamp 16 communicating with the chamber 12.

A source of drying fluid exemplified here as a gas cylinder 18 containing high-pressure nitrogen or dry air supplies that gas via a regulator valve 20 and an open shut-off valve 22 to a supply rail 24.

On an upstream side of the chamber 12, the supply rail 24 communicates with at least one inlet pipe that communicates in turn with the chamber 12. In this example, two inlet pipes 26, 28 extend from the supply rail 24 to the clamp 16 via couplings 30 that serve as chamber inlet interfaces. The flow of drying gas from the supply rail 24 into the chamber 12 is controlled by inlet control valves 32, 34 on the respective inlet pipes 26, 28.

On a downstream side of the chamber 12, at least one outlet pipe communicates with the chamber 12 to carry liquid or wet gas expelled from the chamber 12 by the inwardly-flowing drying gas. In this example, two outlet pipes 36, 38 extend from the clamp 16 to an outlet rail 40. The outlet pipes 36, 38 terminate at the clamp 16 at respective couplings 42 that serve as chamber outlet interfaces. The flow of liquid or wet gas from the chamber 12 to the outlet rail 40 is controlled by outlet control valves 44, 46 on the respective outlet pipes 36, 38.

The inlet control valves 32, 34 and the outlet control valves 44, 46 are closed until the inlet pipes 26, 28 and the outlet pipes 36, 38 have been coupled with the clamp 16. Then, the inlet control valves 32, 34 and the outlet control valves 44, 46 are opened to establish fluid communication between the supply rail 24 and the outlet rail 40 via the chamber 12.

When closed, isolating valves 48, 50 on the supply rail 24 and the outlet rail 40 respectively isolate the supply rail 24 and the outlet rail 40 from the remainder of the drying system 10. The drying system 10 is now configured for a first, open-loop stage of operation, namely dewatering to remove most of the liquid trapped in the chamber 12. This mode of use is shown in FIG. 1 of the drawings.

In this dewatering mode, with the isolating valves 48, 50 closed, high-pressure gas from the cylinder 18 flows into the chamber 12 via the supply rail 24 and the inlet pipes 26, 28 through the open inlet control valves 32, 34. That gas displaces and expels liquid in the chamber 12, which exits the chamber 12 through the outlet pipes 36, 38 and the open outlet control valves 44, 46 to enter the outlet rail 40.

As the isolating valve 50 associated with the outlet rail 40 remains closed at this stage, the liquid from the chamber 12 is expelled from the outlet rail 40 through an outlet valve 52. The liquid expelled from the chamber 12 in this way may be discharged from the system 10 into the surrounding sea water if that liquid is sufficiently clean water. However, if there is any pollution hazard from contaminants that may be mixed with the water, the liquid expelled from the chamber 12 can be collected in a storage tank downstream of the outlet valve 52. Such a storage tank can be implemented on the drying skid to be raised to the surface and disposed of appropriately after a drying operation has been completed. As an alternative, it would be possible to remove liquid expelled from the chamber 12 through an extractor pipe external to the system 10.

When most of the free liquid has been expelled from the chamber 12 and through the outlet valve 52—as may be evidenced by gas exiting the outlet valve 52—the drying system 10 is switched into a different mode for a second, closed-loop stage of operation, namely dehumidifying. At the start of this second stage, most of the liquid in the chamber 12 has been ejected by the first stage of operation but surface wetness and some droplets or other small volumes of liquid will initially persist within the chamber 12.

To configure the drying system 10 for dehumidification as shown in FIG. 2 of the drawings, the outlet valve 52 is closed and the isolating valves 48, 50 are opened. The chamber 12 remains at a high pressure imparted by the drying gas still being supplied from the cylinder 18 through the regulator valve 20. However, the drying system 10 is now a closed-loop system in which high-pressure drying gas need neither be vented nor therefore introduced in any substantial volume. Thus, in principle, the regulator valve 20 and/or the shut-off valve 22 could be closed. The high-pressure drying gas is instead repeatedly recirculated and continuously dried. This provides a huge saving in the volume of gas that must be consumed over the extended period that is necessary to dry the chamber 12 to the required extent.

It will be noted that when the isolating valves 48, 50 are opened, the supply rail 24 and the outlet rail 40 joined by a recirculating connecting pipe 54 serve as upstream and downstream sections respectively of a closed circuit that also comprises the chamber 12 and the inlet and outlet pipes 26, 28, 36, 38. The circuit further includes, on the connecting pipe 54: a pump 56 for driving the recirculating flow of gas through the circuit; a dehumidifier 58 for extracting moisture entrained as droplets or vapour in wet or humid gas exiting the chamber 12; and moisture sensors 60 upstream and downstream of the dehumidifier 58 for measuring the dryness of the gas before and after it passes through the dehumidifier 58.

A sump may be provided additionally to capture liquid droplets in the connecting pipe 54 or the outlet rail 40 but is not shown in FIG. 1. Like liquid expelled from the chamber 12 in the dewatering operation, liquid captured by the sump or by the dehumidifier 58 may be discharged into the surrounding sea water or collected in a storage tank or removed through an extractor pipe for subsequent correct disposal at the surface. A sump, a storage tank, or an extractor pipe are preferably located at a low point of the piping system.

In the dehumidifying operation, the pump 56 is operated to create a flow of drying gas in the circuit of the drying system 10. The continually circulating flow of gas through the chamber 12 entrains or evaporates liquid such as droplets to be carried to, and captured by, the dehumidifier 58 and a sump, if fitted.

The moisture sensors 60 upstream and downstream of the dehumidifier 58 allow the dryness of the gas flow to be monitored and measured until an acceptable level of dryness is attained. At that point, it can be inferred that the chamber 12 is sufficiently dry and that the drying operation involving successive dewatering and dehumidifying stages may be brought to an end.

To end the drying operation, the pump 56 is switched off, the inlet control valves 32, 34 and the outlet control valves 44, 46 are closed and the inlet pipes 26, 28 and the outlet pipes 36, 38 are uncoupled from the clamp 16. The drying skid may then be uncoupled from the clamp 16 and retrieved to the surface for maintenance, storage and future use.

When the chamber 12 is dry, grout may be injected into the chamber from a grout injection system on the skid. However, grout injection can instead be done independently, for example by another skid.

The valves and the pump may be actuated remotely from a surface control system or underwater by ROV or diver intervention. Suitable interfaces such as handles or mechanical couplings may be provided for actuation of the valves and the pump by an ROV or diver.

The pump may be powered electrically by an on-board battery of the system or by electrical or hydraulic power supplied from an ROV or from the surface. The on-board power solution is preferred for convenience.

Many other variations are possible within the inventive concept. For example, a heating circuit may be placed on the fitting to improve water removal, or the drying fluid itself may be heated. Drying gas may be supplied from more than one gas cylinder. Also, drying fluids other than gases like air or nitrogen could be used, such as liquid alcohols. Indeed, different drying fluids may be used for dewatering and dehumidifying the chamber. However, care must be taken that any drying fluid chosen does not leave a residue that may adversely affect the surface condition of the structure being worked on, for example for adhesion of a grout or a coating such as an epoxy.

The invention claimed is:

1. A subsea drying system for drying a chamber underwater, the system comprising:
 a source of pressurised drying fluid comprising a container of drying fluid located underwater and beside the chamber;
 an upstream piping between the source and a chamber inlet interface for conveying drying fluid to the chamber in use;
 a downstream piping between a chamber outlet interface and an outlet for conveying to the outlet and expelling from the system through the outlet liquid displaced from the chamber by drying fluid entering the chamber in a dewatering mode;
 a recirculation path between the downstream piping and the upstream piping for conveying drying fluid exiting the chamber from the downstream piping to the upstream piping in a dehumidifying mode;
 a dehumidifier in the recirculation path; and
 a valve system for selectively closing and opening the recirculation path, the valve system comprising a first isolating valve between the upstream piping and the recirculation path, a second isolating valve between the downstream piping and the recirculation path, and an outlet valve at the outlet;
 the system being is operable in an open loop in the dewatering mode and in a closed loop in the dehumidifying mode;
 in the open loop, the valve system closes the recirculation path by closing the first and second isolating valves, and opening the outlet valve, so as to isolate the upstream and downstream piping from the recirculation path and prevent fluid communication therebetween, thereby directing liquid displaced from the chamber through the outlet; and
 in the closed loop, the valve system opens the recirculation path by opening the first and second isolating valves, and closing the outlet valve, so as to couple the upstream and downstream piping in a closed fluid circuit with the chamber via the recirculation path, thereby directing drying fluid exiting the chamber through the dehumidifier to the upstream piping.

2. The drying system of claim 1, further comprising a pump in the recirculation path for driving recirculating flow of the drying fluid along the recirculation path.

3. The drying system of claim 1, further comprising at least one moisture sensor in the recirculation path for sensing a dryness level of the drying fluid exiting the chamber.

4. The drying system of claim 3, wherein the at least one moisture sensor includes at least one moisture sensor in the recirculation path upstream of the dehumidifier and at least one moisture sensor in the recirculation path downstream of the dehumidifier.

5. The drying system of claim 1, wherein the outlet is arranged to discharge liquid from the chamber into surrounding water in use.

6. The drying system of claim 1, implemented as a transportable unit that can be lowered through water and docked with a subsea fitting or structure defining the chamber.

7. The drying system of claim 6, implemented on a remotely operated underwater vehicle "ROV" transportable subsea skid.

8. A subsea fitting or structure defining a chamber, fitted with or docked with the drying system of claim 1.

9. The drying system of claim 1, further comprising a pump in the recirculation path for driving recirculating flow of the drying fluid along the recirculation path.

10. The drying system of claim 9, further comprising at least one moisture sensor in the recirculation path for sensing a dryness level of the drying fluid exiting the chamber.

11. The drying system of claim 10, wherein the at least one moisture sensor includes at least one moisture sensor in the recirculation path upstream of the dehumidifier and at least one moisture sensor in the recirculation path downstream of the dehumidifier.

12. The drying system of claim 11, wherein the outlet is arranged to discharge the liquid from the chamber into surrounding water in use.

13. A method of drying a chamber underwater, the method comprising:
- conveying pressurised drying fluid to the chamber through upstream piping from a source of drying fluid located underwater and beside the chamber;
- displacing liquid from the chamber through downstream piping as drying fluid enters the chamber to dewater the chamber;
- dehumidifying drying fluid exiting the chamber; and
- recirculating drying fluid that has been dehumidified after exiting the chamber back into the chamber via a recirculation path to dehumidify the chamber;
- the method further comprising dewatering the chamber in an open-loop configuration and dehumidifying the chamber in a closed loop configuration;
- dewatering the chamber in the open-loop configuration comprises closing the recirculation path by isolating the upstream and downstream piping from the recirculation path, thereby directing the liquid displaced from the chamber to an outlet for expulsion; and
- dehumidifying the chamber in the closed loop configuration comprises opening the recirculation path by fluidly coupling the upstream and downstream piping with the recirculation path, thereby directing drying fluid exiting the chamber back through the upstream piping for subsequent re-entry to the chamber.

14. The method of claim 13, comprising switching from the open-loop configuration into the closed-loop configuration upon displacing most of the liquid initially occupying the chamber.

15. The method of claim 13, comprising expelling the displaced liquid into surrounding water or into an extractor pipe or storage tank.

16. The method of claim 13, further comprising sensing a dryness level of the drying fluid exiting the chamber before dehumidification.

17. The method of claim 16, comprising sensing a dryness level of the drying fluid after dehumidification and before recirculation back into the chamber.

* * * * *